July 6, 1926.  1,591,775
A. PERLING
LAWN MOWER
Filed Sept. 12, 1924    2 Sheets-Sheet 2
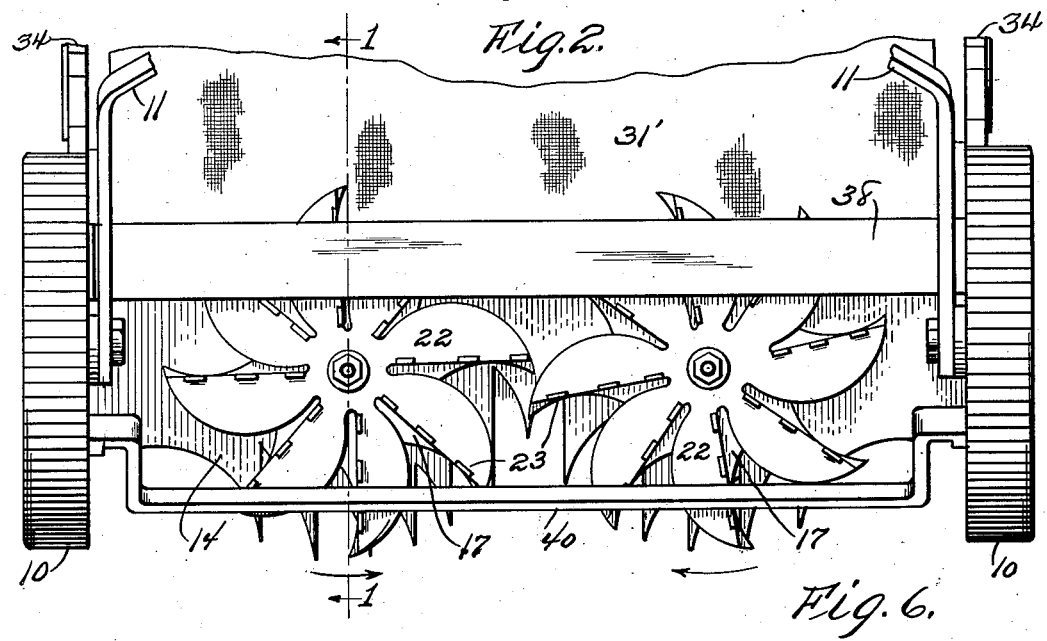
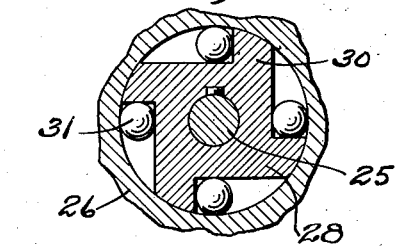
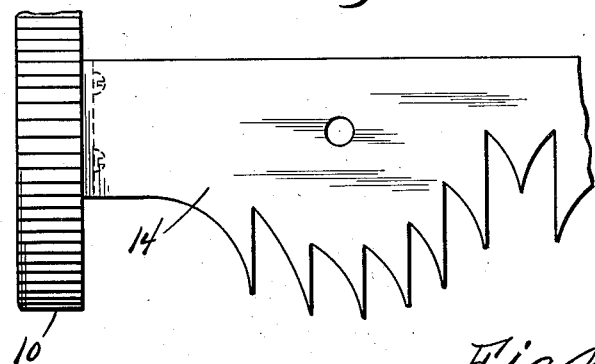
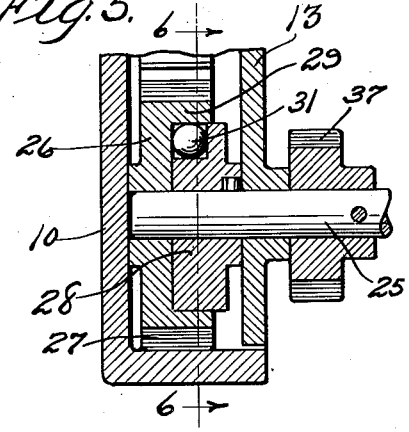
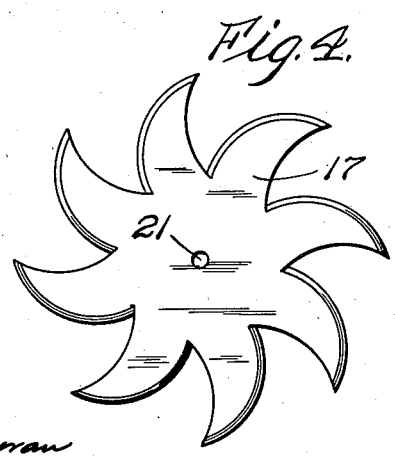
Albert Perling
INVENTOR
BY Victor J. Evans
ATTORNEY
WITNESS:

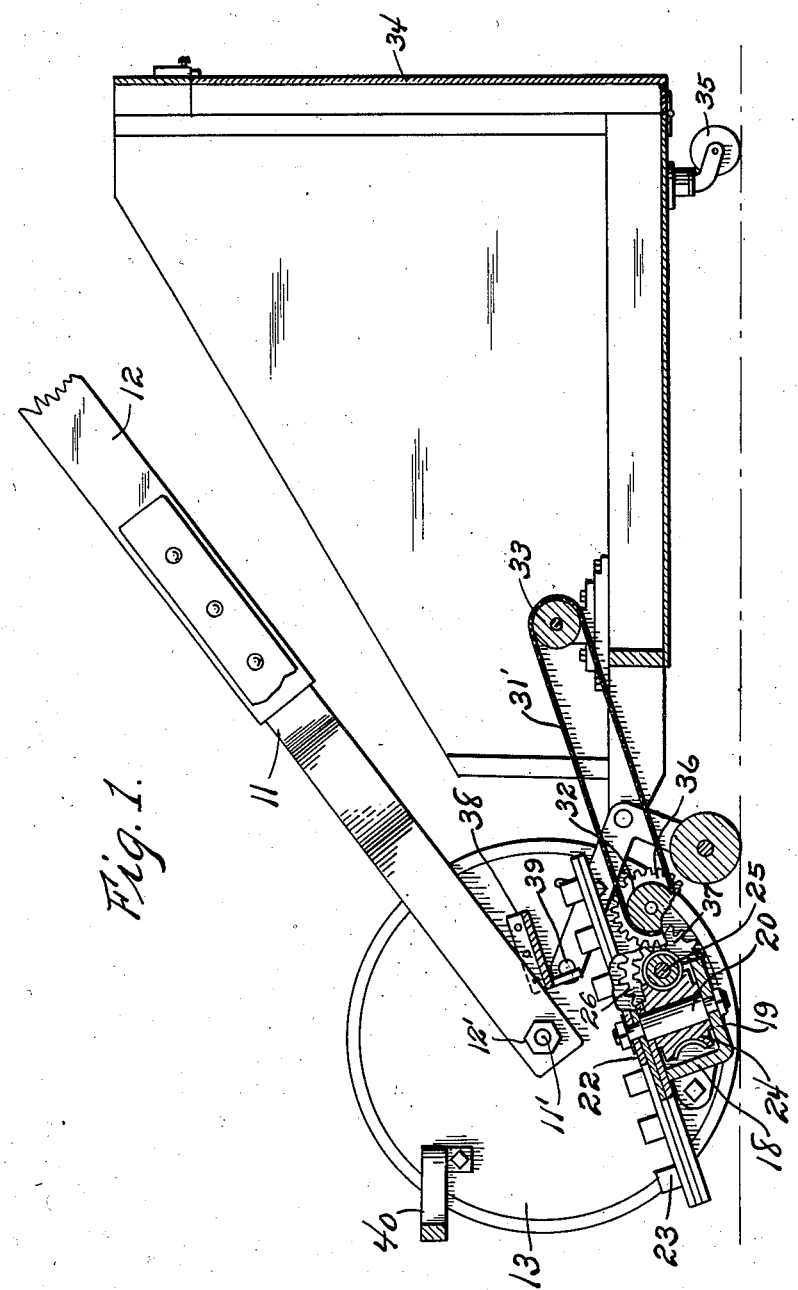

Patented July 6, 1926.

1,591,775

UNITED STATES PATENT OFFICE.

ALBERT PERLING, OF PARIS, KENTUCKY.

LAWN MOWER.

Application filed September 12, 1924. Serial No. 737,378.

This invention relates to lawn mowers, and contemplates a structure by means of which the grass can be cut in a comparatively quick, convenient and noiseless manner, and the cut grass subsequently conveyed into a receptacle arranged to trail behind the mower for this purpose.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a sectional view taken on line 1—1 of Figure 2.

Figure 2 is a fragmentary top plan view.

Figure 3 is a fragmentary plan view of the stationary blade.

Figure 4 is a detail view of one of the rotary cutters.

Figure 5 is a fragmentary sectional view through one of the wheels.

Figure 6 is a sectional view taken on line 6—6 of Figure 5.

The lawn mower forming the subject matter of this invention is adapted to be used in the same manner as the ordinary lawn mower and therefore includes the spaced wheels 10, and the usual frame and handle 11 and 12 respectively. Each wheel 10 is of the ordinary well known construction, and includes a stationary inner disk like member 13 clearly illustrated in Figure 5, and arranged between and supported by the stationary members 13 of the respective wheels is a toothed stationary blade 14 such as shown in Figure 3. The disks 13 and wheels 10 are retained in their proper positions by means of the axle bolts 11' which extend through the central portions of the disks 13 and wheels 10 with their inner ends projecting through the lower ends of the frame 11 and having nuts 12' threaded thereon for retaining the several elements in position.

Arranged above this stationary blade 14 is a plurality of toothed rotary cutters of the construction indicated at 17 in Figure 4, and these cutters rotate inwardly over the stationary blade 14, and cooperate with the teeth of said blade 14 to quickly and conveniently cut the grass, in a comparatively noiseless manner. Arranged directly beneath the stationary blade 14 and also supported by the disk like members 13 of the respective wheels, is an angle bar including a vertical branch 18 and a horizontally disposed branch 19, and journaled between the horizontal branch and the stationary blade is a stub shaft 20 for each of the rotary cutters 17. It will be noted upon inspection of Figure 1 that each of these shafts has a reduced extremity journaled in a horizontal branch of this angle bar, while the upper extremity of said shaft is also reduced, and is received by openings 21 formed in the rotary cutters 17, and similar openings formed in a toothed disk-like member 22, used for the purpose of gathering and conveying the cut grass rearwardly of the mower in a manner to be hereinafter described. There is one of these disk-like members 22 arranged directly upon each rotary cutter 17, and these two elements, namely the rotary cutter and the disk-like member 22 rotate as a unit. Rising from the teeth of the disk-like member 22 are upstanding lugs 23 which are used to force the cut grass rearwardly of the machine. While any suitable means may be employed for rotating or operating the cutters 17, I preferably employ worm gears 24, there being one of these gears mounted on each shaft 20, and driven from the shaft 25 which is journaled in the stationary disk members 13 forming part of the wheels 10. This shaft 25 is in turn rotated in the manner to be presently described when the lawn mower is in use.

Any suitable means may be employed for rotating the shaft 25 incident to the rotation of the wheels 10. However, I preferably make use of a small gear 26 mounted on the shaft 25 and arranged to mesh with the internal gear 27 of the wheel 10. Keyed upon the shaft 25 is a clutch member 28 which is arranged in a depression formed in the gear 26 as shown in Figure 5, which construction provides said gear with a flange 29. Each corner of the member 28 is formed with a projection 30 which contacts with the adjacent wall of the flange 29, the space between each side of the clutch member and said flange defining a pocket for the reception of a ball 31. This construction and arrangement of parts is clearly shown in Figures 5 and 6, and it is manifest that when the wheel 10 rotates in one direction, the shaft 25 is rotated through the clutch just described.

Arranged directly beneath and projecting rearwardly of the rotary cutters is an endless conveyor 31' trained over suitable rollers 32 and 33 respectively, this conveyor being disposed to receive the cut grass and ultimately deposit it within a suitable receptacle 34 connected to the mower and provided with casters 35. The shaft of roller 32 is provided with a gear 36 meshing with a similar gear 37 on the shaft 25, so that the endless conveyor 31' is operated simultaneously with the rotation of the shaft 25.

Arranged directly above the rotary cutters and also connected to and supported by the stationary disk like members 13 is a plate 38 having depending teeth 39 which cooperate with the upstanding lugs 23 of the gathering disks 22, to prevent the cut grass from being carried around with the disks incident to the rotation thereof. In other words the cut grass is carried by the gathering disk 31 until it is brought in contact with the toothed plate 38 which retards the movement of the grass during the continued rotation of the disks 22, and thereby separates the grass from the upstanding lugs so that the said cut grass can be deposited upon the endless conveyor 31 which in turn carries the cut grass into the receptacle 34. Supported by the stationary disk like members 13 and projecting in advance of the wheels 10 is a bumper 40 which prevents the cutters from being brought into contact with walls or other objects which might possibly injure the cutters as will be readily understood.

In practice, the lawn mower is moved or pushed over the ground in the ordinary well known manner and during the rotation of the wheels 10, the rotary cutters 17 are put into operation, each cutter rotating simultaneously with the gathering disk 22 with which it is associated. These rotary cutters rotate inwardly, and thereby cut the grass in a quick and convenient manner, and with comparatively little noise, which is ordinarily an objectionable feature with mowers of present day construction. As the grass is cut it is carried around toward the rear of the mower by the gathering disks 22, and subsequently forced by these disks onto the endless conveyor 21 which in turn carries the cut grass into the receptacle 34 which may be of any suitable size or configuration. It will be further noted that the rotary cutters extend in advance of the wheels 10 so that the grass can be cut close to the house or walk.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. A lawn mower comprising spaced wheels, each including a stationary inner disk like member, a toothed blade supported by said members, toothed rotary cutters journaled on said blade, means for simultaneously rotating said cutters, a toothed disk arranged above and connected with each cutter for rotation therewith, lugs rising from the teeth of said toothed disks for gathering and moving the cut material rearwardly of the mower, a wheeled receptacle coupled to said mower, an endless conveyor arranged to receive the cut material from said toothed disks and convey it into said receptacle, and means for operating said conveyor when the mower is moved over the surface.

2. A lawn mower including spaced traction wheels, stationary disk members carried by said wheels, stationary blades supported by said disks, a toothed rotary cutting blade supported upon each stationary blade and rotating inwardly over said stationary blade, a conveyer, means for movably supporting the conveyer between the stationary disks, toothed disk members rotatable above the cutting disks and having blades formed with straight edges, upstanding lugs attached to the straight edges for gathering the cut grass and pushing the same rearwardly of the mower toward the conveyer.

In testimony whereof I affix my signature.

ALBERT PERLING.